US010800222B2

(12) United States Patent
Norwood et al.

(10) Patent No.: US 10,800,222 B2
(45) Date of Patent: Oct. 13, 2020

(54) JOUNCE BUMPER INCLUDING INTEGRATED VALVE

(71) Applicant: Ford Global Technologies, LLC, Dearborn, MI (US)

(72) Inventors: Joshua Norwood, Detroit, MI (US); Zachary Machinchick, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 11 days.

(21) Appl. No.: 16/160,077

(22) Filed: Oct. 15, 2018

(65) Prior Publication Data

US 2020/0114722 A1 Apr. 16, 2020

(51) Int. Cl.
| | | |
|---|---|---|
| *B60G 17/048* | (2006.01) | |
| *F16F 9/50* | (2006.01) | |
| *B60G 17/052* | (2006.01) | |
| *F16F 9/04* | (2006.01) | |
| *F16F 9/32* | (2006.01) | |

(52) U.S. Cl.
CPC ..... *B60G 17/0485* (2013.01); *B60G 17/0525* (2013.01); *F16F 9/0472* (2013.01); *F16F 9/3292* (2013.01); *F16F 9/50* (2013.01); *B60G 2202/152* (2013.01); *B60G 2500/204* (2013.01); *B60G 2500/206* (2013.01); *B60G 2500/2014* (2013.01)

(58) Field of Classification Search
CPC .............. B60G 17/0485; B60G 17/048; B60G 17/0521; B60G 17/0272; B60G 17/08; B60G 11/27; F16F 9/05; F16F 9/04; F16F 9/0472; F16F 9/052; F16F 9/49; F16F 9/58; F16F 9/585
IPC ..................................................... B60G 17/048
See application file for complete search history.

(56) References Cited

U.S. PATENT DOCUMENTS

| | | | | |
|---|---|---|---|---|
| 3,000,624 A | * | 9/1961 | Cislo ...................... | F16F 9/084 267/64.21 |
| 3,074,709 A | * | 1/1963 | Ellis .......................... | F16F 9/05 267/64.21 |
| 3,372,919 A | * | 3/1968 | Jackson ............... | B60G 17/048 267/64.18 |
| 4,592,540 A | * | 6/1986 | Yokoya ................. | B60G 17/04 188/319.1 |
| 6,923,433 B2 | * | 8/2005 | Gross ..................... | B60G 15/14 267/122 |
| 7,331,571 B2 | | 2/2008 | Li | |

(Continued)

FOREIGN PATENT DOCUMENTS

| | | | | |
|---|---|---|---|---|
| CN | 106369097 B | | 4/2018 | |
| DE | 1056488 B | * | 4/1959 | ........... B60G 17/048 |

(Continued)

*Primary Examiner* — Bradley T King
*Assistant Examiner* — Stephen M Bowes
(74) *Attorney, Agent, or Firm* — Raymond L. Coppiellie; Bejin Bieneman PLC (57) ABSTRACT

An air spring includes a sleeve, a jounce bumper, and a bump cap. The sleeve defines a chamber. The jounce bumper is fixed relative to the sleeve in the chamber. The bump cap is moveable relative to the jounce bumper from a first position to a second position in contact with the jounce bumper. The jounce bumper includes a valve moveable by the bump cap to a closed position when the bump cap moves to the second position.

20 Claims, 9 Drawing Sheets

(56) References Cited

U.S. PATENT DOCUMENTS

| | | | |
|---|---|---|---|
| 9,211,776 B2 | 12/2015 | May | |
| 2013/0161138 A1* | 6/2013 | Barefoot | ................... F16F 9/34
188/282.1 |

FOREIGN PATENT DOCUMENTS

| | | | |
|---|---|---|---|
| DE | 4327585 A1 | 3/1995 | |
| DE | 102010012346 A1 * | 9/2011 | ................ F16F 9/05 |
| EP | 0474171 A1 | 9/1991 | |
| EP | 3190308 B1 * | 1/2019 | ................ F16F 9/04 |
| GB | 1187599 A * | 4/1970 | ........... B60G 17/048 |
| JP | 58030820 A * | 2/1983 | ......... B60G 17/0272 |
| KR | 1020030039150 A | 5/2003 | |
| WO | 2017050556 A1 | 3/2017 | |

\* cited by examiner

FIG. 6

JOUNCE BUMPER INCLUDING INTEGRATED VALVE

BACKGROUND

Vehicles typically include suspension systems. The suspension system of a vehicle is coupled to the vehicle frame and to each wheel assembly. The suspension system absorbs and dampens shocks and vibrations from the wheel assemblies to the vehicle frame. The suspension system may, for example, be an air suspension system. The air suspension system relies on an air compressor to provide pressurized air through airlines to multiple air springs. The air spring may be operable within a range of air pressures. The airlines may include multiple interconnections to assist with assembly. The interconnections may create a risk of loss of air pressure, i.e., air leakage, to the air suspension system.

A pressure retention valve may prevent air from leaking when the air pressure is below a pressure threshold. However, the pressure threshold is below the operable range of the air suspension system to allow normal operation of the air suspension system when the air pressure is within the operable range. There remains an opportunity to design a valve that maintains air pressure in the air spring within an operable range if there is a loss of air pressure to the air suspension system.

DETAILED DESCRIPTION

An air spring includes a sleeve defining a chamber, a jounce bumper fixed relative to the sleeve in the chamber, and a bump cap moveable relative to the jounce bumper from a first position to a second position in contact with the jounce bumper. The jounce bumper includes a valve moveable by the bump cap to a closed position when the bump cap moves to the second position.

The valve may include a cap and a base slidably engaged with the cap. The base may be slidable along an axis relative to the cap between an open position and the closed position.

The base may include a cushion engageable with the bump cap. The cushion may contact the bump cap when the bump cap moves to the second position.

The cap and the base may define a cavity therebetween in the open position. The base may be moved across the cavity and may contact the cap in the closed position.

The cap may include an intake and the base may include an exhaust. The intake and the exhaust may be in fluid communication with each other when the valve is in the open position.

The cap may include a plug extending along the axis towards the base. The plug may be engageable with the exhaust.

The plug may be disposed in the exhaust in the closed position. The plug may prevent fluid communication from the exhaust to the intake when the valve is in the closed position.

The cap and the base may include axial locking elements slideably engaged with each other.

The cap and the base may include rotational locking elements engaged with each other.

The air spring may include a damper including a tube disposed external to the chamber and a rod extending from the tube into the chamber. The jounce bumper may be engaged with the rod.

The valve may include a cap and a base slideably engaged with the cap along an axis. The cap may be fixed to the rod and the base may be slidable relative to the rod along the axis.

The air spring may include an upper plate spaced from the bump cap and including an inlet. The valve may be engaged with the inlet.

The valve may allow fluid communication between the chamber and the inlet when the valve is in an open position.

The valve may prevent fluid communication from the chamber to the inlet and may be moveable from the closed position to an open position by air flow from the inlet.

A jounce bumper includes a valve. The valve includes a cap and a base slideably engaged with the cap. The base is slidable relative to the cap along an axis from an open position to a closed position. The cap and the base define a cavity therebetween in the open position. The base is moved across the cavity and contacts the cap in the closed position.

The base may include a cushion extending along the axis away from the cap.

The cap may include an intake and the base may include an exhaust. The intake and the exhaust may be in fluid communication with each other through the cavity when the valve is in the open position.

The cap may include a plug extending along the axis towards the base. The plug may be engaged with the exhaust in the closed position to prevent fluid communication from the exhaust to the intake.

The valve may be moveable from the closed position to the open position by air flow through the intake toward the base The cap and the base may include locking elements engaged with each other.

With reference to the Figures, wherein like numerals indicate like parts throughout the several views, a vehicle 10 is generally shown. The vehicle 10 includes a vehicle body 12, a wheel 14, and an air spring 16 supporting the vehicle body 12 on the wheel 14. During operation of the vehicle 10, the air spring 16 may control the vehicle body 12 at a desired ride height. In other words, the air spring 16 may maintain a vertical distance between the vehicle body 12 and the wheel 14. The air spring 16 may control the ride height based on air pressure. In other words, the air spring 16 may raise or lower the ride height of the vehicle body 12 by increasing or decreasing the air pressure in the air spring 16, respectively. Additionally, the air spring 16 may absorb and dampen vibrations from the wheel 14 to the vehicle body 12 during operation of the vehicle 10. Similar to the ride height, the amount of absorption and dampening by the air spring 16 is based on the air pressure in the air spring 16. The air spring 16 may absorb and dampen vibrations more when the air pressure is relatively low as compared to when the air pressure is relatively high.

Figure 2A:
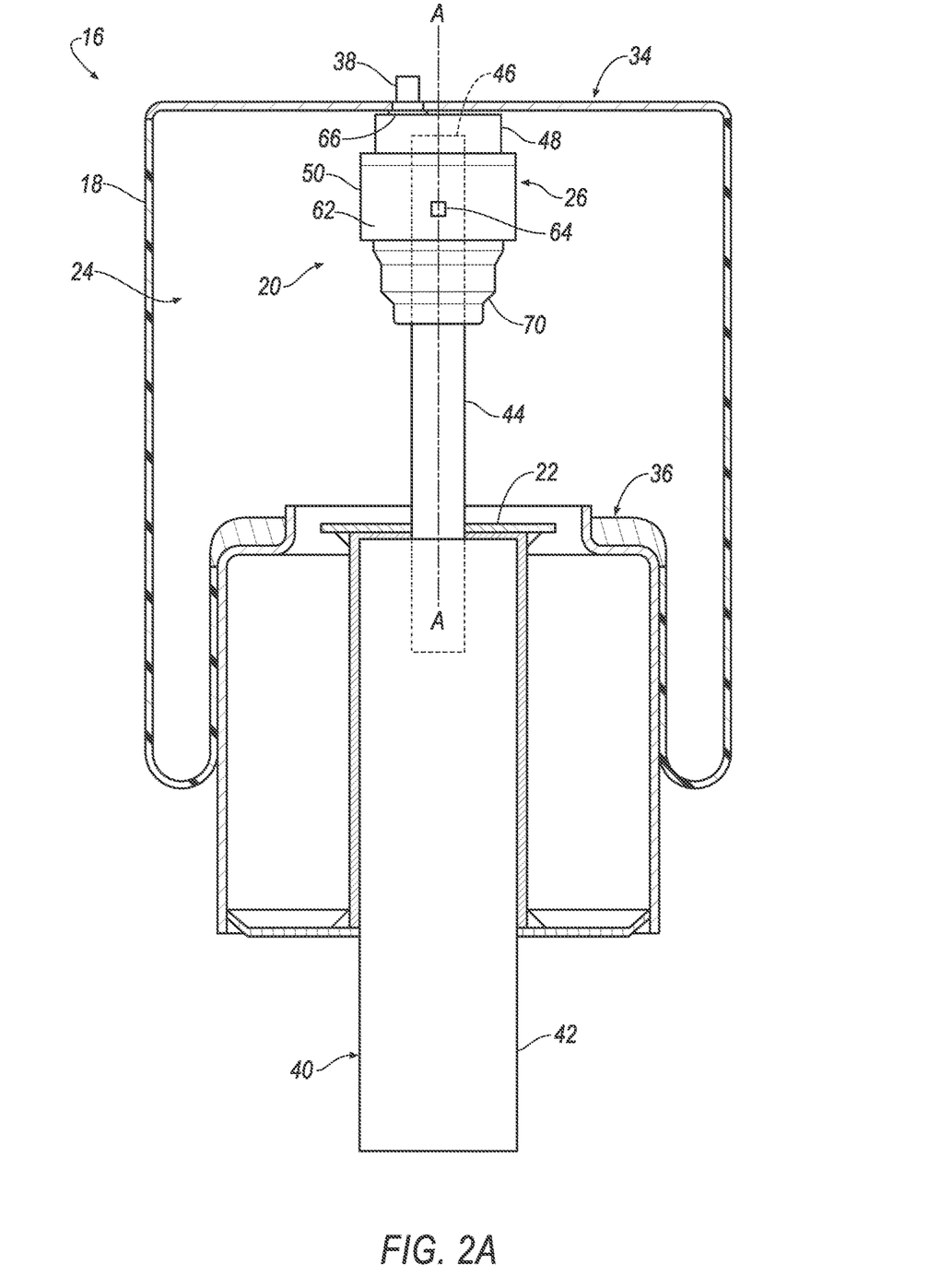
FIG. 2A is a cross-sectional view of an air spring including a bump cap in a first position.
Figure 2B:
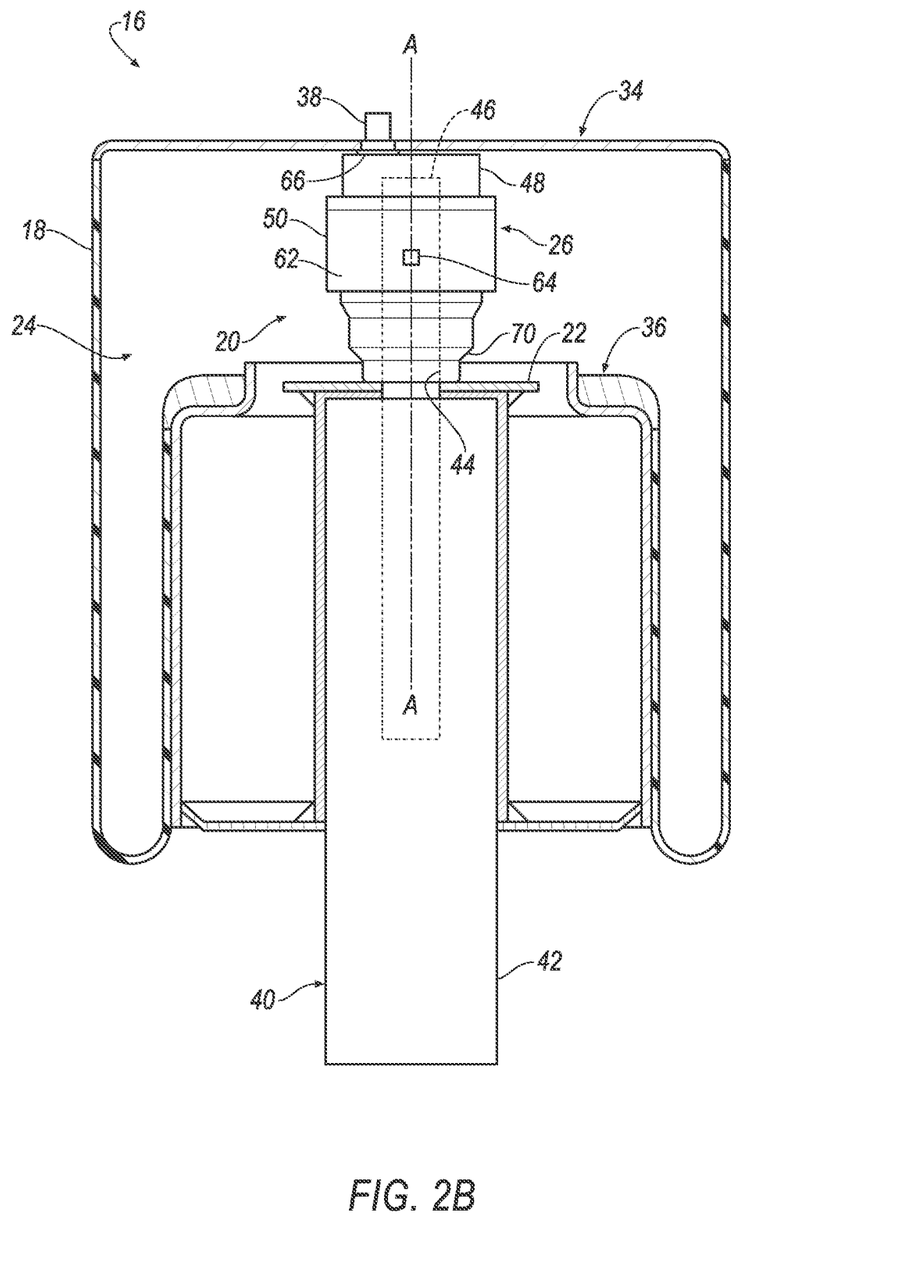
FIG. 2B is a cross-sectional view of the air spring including the bump cap in a second position.
Figure 3:
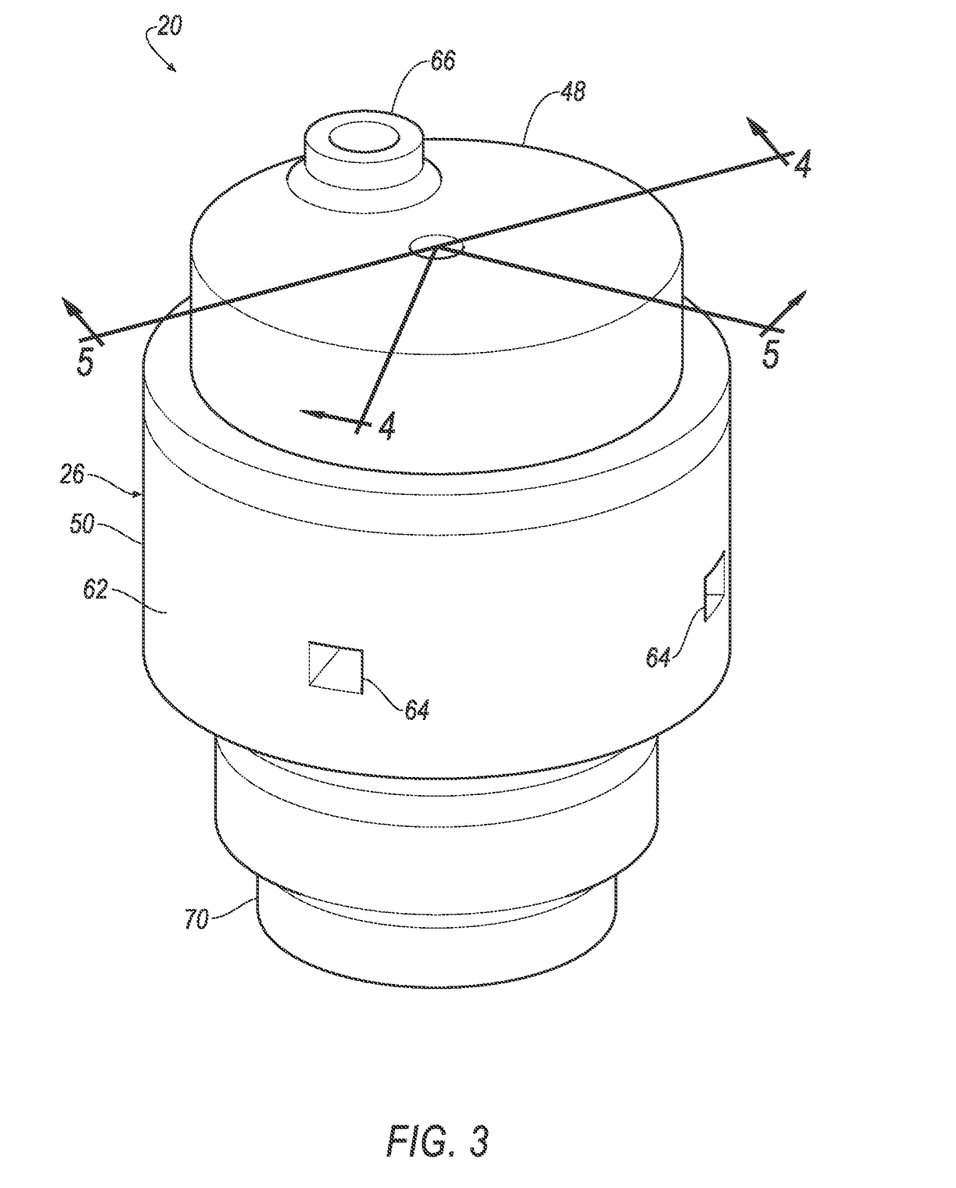
FIG. 3 is a perspective view of a jounce bumper including a valve.

The air spring 16 includes a sleeve 18, a jounce bumper 20, and a bump cap 22. The sleeve 18 defines a chamber 24. The jounce bumper 20 is fixed relative to the sleeve 18 in the chamber 24. The bump cap 22 is moveable relative to the jounce bumper 20 from a first position spaced from the jounce bumper 20, as shown in FIG. 2A, to a second position in contact with the jounce bumper 20, as shown in FIG. 2B. The jounce bumper 20 includes a valve 26 moveable by the bump cap 22 to a closed position when the bump cap 22 moves to the second position. As the air pressure in the air spring 16, e.g., the chamber 24, decreases, the bump cap 22 moves from the first position to the second position. When the bump cap 22 moves to the second position, the bump cap 22 engages the jounce bumper 20 to move the valve 26 from the open position to the closed position. In this situation, the valve 26 prevents air from exiting the chamber 24. In other words, the valve 26 maintains a minimum air pressure in the air spring 16 when the valve 26 is in the closed position. By closing the valve 26 when the bump cap 22 contacts the jounce bumper 20, the air spring 16 maintains the minimum air pressure and a minimum ride height, which may assist in preventing or reducing damage to the air spring 16 during vehicle operation. Also, the valve 26 may be moveable by air, e.g., pressurized air, from the closed position to the open position. By allowing air flow into the chamber 24 when the valve 26 is in the closed position, the valve 26 allows the air pressure and ride height to be increased, which moves the bump cap 22 to the first position and the valve 26 to the open position.

The vehicle 10 may be, for example, any suitable type of automobile. The vehicle 10 may have a body-on-frame construction (also referred to as a cab-on-frame construction). In other words, the vehicle 10 includes the vehicle body 12 and a frame that are separate components, i.e., are modular, and the vehicle body 12 is supported on and affixed to the frame. As another example, the vehicle 10 architecture may be a unibody construction, i.e., a unitary-body construction, in which the vehicle body 12 and the frame are unitary. The vehicle body 12 and/or the frame can be formed of any suitable material, e.g., steel, aluminum, etc.

Figure 1:
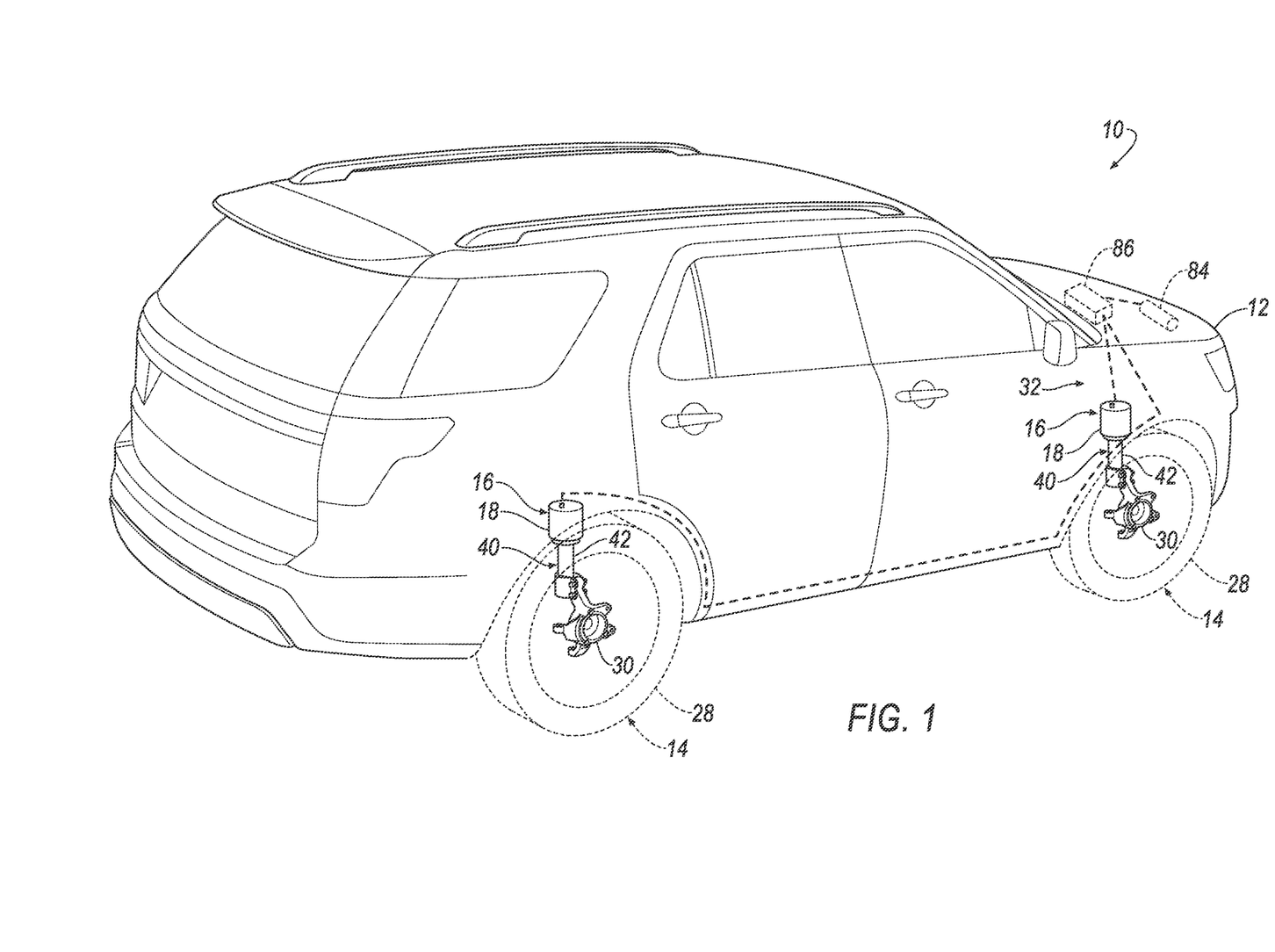
FIG. 1 is a perspective view of a vehicle including a plurality of air springs.

The vehicle 10 includes four wheels 14. The wheel 14 is rotatable and engages a roadway to move the vehicle 10. Each wheel 14 includes a hub (not numbered), a tire 28 extending circumferentially around the hub, and a knuckle 30, as shown in FIG. 1. The knuckle 30 connects the hub of the wheel 14 to the air spring 16. In other words, the vehicle 10 includes four air springs 16. The knuckle 30 may connect a steering rack (not shown) to the hub and may transmit movement from the steering rack to the hub, turning the wheel 14 to steer the vehicle 10. The hub and tire 28 can rotate together relative to the knuckle 30.

With reference to FIGS. 2A and 2B, the vehicle 10 may include a suspension system 32 including the air springs 16. The air spring 16 may include an upper plate 34 and a lower plate 36 spaced from the upper plate 34 along an axis A. The sleeve 18 may extend from the upper plate 34 to the lower plate 36. The sleeve 18 may, for example, be fixed to the upper plate 34 and the lower plate 36. Specifically, the sleeve 18 may be sealably fixed to the upper plate 34 and the lower plate 36 to prevent air from escaping the chamber 24 adjacent to the upper plate 34 and the lower plate 36. Additionally, the sleeve 18 may extend circumferentially about the axis A. The sleeve 18 may be any suitable type of sleeve 18. For example, as shown in the Figures, the sleeve 18 may be a rolling lobe. Alternatively, the sleeve 18 may be a convoluted bellow, a tapered sleeve, etc.

The sleeve 18 may be flexible, i.e., formed of a flexible material. For example, the sleeve 18 may be able to expand and contract as the bump cap 22 moves between the first position and the second position. As another example, the sleeve 18 may be able to roll and unroll as the bump cap 22 moves between the first position and the second position. The sleeve may be formed of any suitable material, e.g., rubber, elastomer, etc.

The bump cap 22 may be disposed adjacent to the lower plate 36. For example, the bump cap 22 may abut the lower plate 36. The bump cap 22 may, for example, be disposed in the chamber 24 as shown in FIGS. 2A and 2B. In other words, the bump cap 22 may be disposed between the upper plate 34 and the lower plate 36. Alternatively, the bump cap 22 may be external to the chamber 24. In this situation, the lower plate 36 may be disposed between the bump cap 22 and the upper plate 34. The bump cap 22 may be formed of any suitable material, e.g., metal, plastic, etc.

The bump cap 22 is moveable from the first position, as shown in FIG. 2A, to the second position, as shown in FIG. 2B, when the air pressure in the chamber 24 decreases. For example, the bump cap 22 may be fixed relative to the lower plate 36. In the first position, the bump cap 22 is spaced from the jounce bumper 20 along the axis A. In the second position, the bump cap 22 contacts, i.e., engages, the jounce bumper 20. The bump cap 22 is in the second position when the air pressure is below a pressure threshold. As the air pressure decreases, the bump cap 22 moves along the axis A relative to the jounce bumper 20. In other words, the bump cap 22 moves towards the jounce bumper 20 when the air pressure decreases and away from the jounce bumper 20 when the air pressure increases.

With reference to FIGS. 2A and 2B, the chamber 24 is disposed between the upper plate 34, the lower plate 36, and the sleeve 18. The chamber 24 may, for example, extend along the sleeve from the upper plate 34 to the lower plate 36, and circumferentially about the axis A. In other words, the chamber 24 may have a cylindrical shape. The chamber 24 may be expandable and compressible along the axis A. In other words, the lower plate 36 may be moveable relative to the upper plate 34 along the axis A. For example, the lower plate 36 may be spaced farther from the upper plate 34 when the bump cap 22 is in the first position as compared to the second position. During movement of the bump cap 22 from the first position to the second position, i.e., during a decrease in air pressure in the chamber 24, the sleeve 18 may be compressed along the axis A. In other words, the lower plate 36 moves along the axis A towards the upper plate 34. Similarly, during movement of the bump cap 22 from the second position to the first position, i.e., during an increase in air pressure in the chamber 24, the sleeve 18 may be expanded along the axis A. In other words, the lower plate 36 moves along the axis A away from the upper plate 34. The sleeve 18 may be formed of any suitable material, e.g., rubber, elastomer, etc.

The upper plate 34 may include an inlet 38, as shown in FIGS. 2A and 2B. The inlet 38 is in fluid communication with the chamber 24. The air spring 16 may be a closed system. In this situation, the inlet 38 may allow air flow into and out of the chamber 24. Alternatively, the air spring 16 may be an open system. In this situation, the air spring 16 may include an outlet, e.g., disposed on one of the upper plate 34 and the lower plate 36. The inlet 38 may allow air flow into the chamber 24, and the outlet may allow air flow from the chamber 24, e.g., to the environment.

The lower plate 36 may include a hole (not numbered) disposed on the axis A. The hole may extend through the lower plate 36 into the chamber 24. The bump cap 22 may, for example, be disposed adjacent to the hole. As another example, the hole may extend through the bump cap 22 along the axis A.

The air spring 16 may include a damper 40 having a tube 42 and a rod 44 slideably engaged with the tube 42, as shown in FIGS. 1-2B. The damper 40 may be any suitable type of damper 40, e.g., a monotube damper, a twin-tube damper, a dashpot, etc. The tube 42 may be disposed external to the chamber 24. For example, the tube 42 may be proximate, i.e., abut, the lower plate 36. The tube 42 may be fixed directly to the lower plate 36, e.g., by fasteners, welding, etc. Alternatively, the tube 42 may be fixed relative to the lower plate 36, i.e., indirectly fixed to the lower plate 36. Additionally, the tube 42 may, for example, be fixed to the knuckle 30, as shown in FIG. 1. In other words, the tube 42 may extend from the knuckle 30 to the lower plate 36.

The rod 44 may extend into the chamber 24 along the axis A, as shown in FIGS. 2A and 2B. Specifically, the rod 44 may extend into the chamber 24 through the hole of the lower plate 34. The rod 44 may slide relative to the tube 42 along the axis A. The rod 44 may slide relative to the tube 42, for example, when the air pressure is increased or decreased in the chamber 24.

With reference to FIGS. 2A and 2B, the rod 44 may include an end 46 spaced from the tube 42 along the axis A. The end 46 may be disposed proximate the upper plate 34. The end 46 of the rod 44 may be fixed relative to the upper plate 34, as set forth further below. The end 46 of the rod 44 may be spaced farther from the tube 42 when the bump cap 22 is in the first position as compared to the second position. In other words, the rod 44 may have a length (not numbered) extending from the tube 42 to the end 46. The length of the rod 44 is longer when the bump cap 22 is in the first position as compared to the second position. The length of the rod 44 may be directly related to the ride height of the vehicle body 12. For example, the ride height may be higher when the bump cap 22 is in the first position as compared to the second position.

With continued reference to FIGS. 2A and 2B, the jounce bumper 20 is disposed proximate the upper plate 34. The jounce bumper 20 is supported by the upper plate 34. For example, the jounce bumper 20 may be fixed directly to the upper plate 34. The jounce bumper 20 is engaged with the inlet 38, as set forth further below. The jounce bumper 20 extends from the upper plate 34 along the axis A towards the lower plate 36. The jounce bumper 20 is spaced from the lower plate 36 when the bump cap 22 is in the first position. The jounce bumper 20 is proximate, e.g., may abut, the lower plate 36 when the bump cap 22 moves to the second position.

Figure 4A:
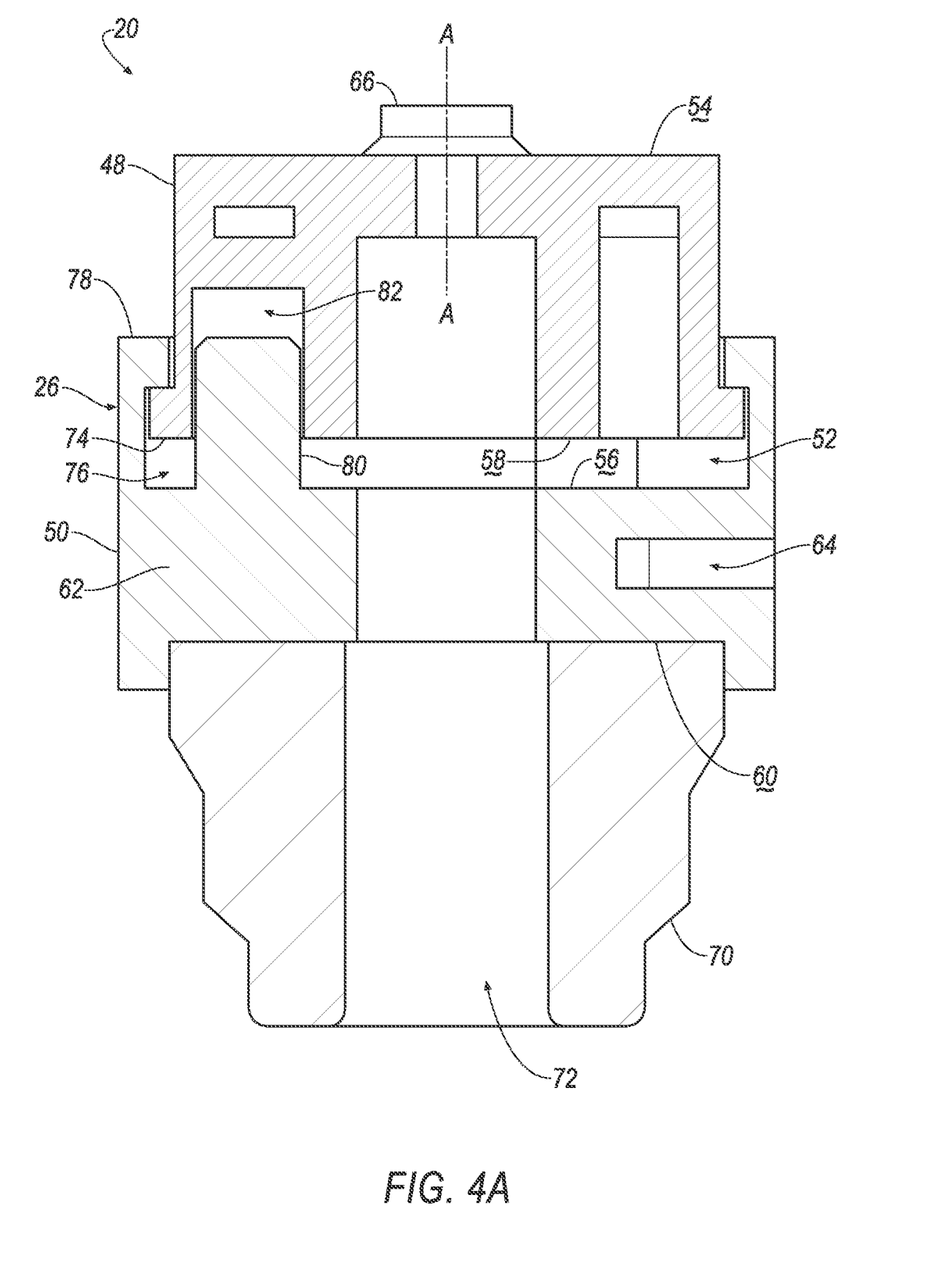
FIG. 4A is a cross sectional view along line 4 of the valve in an open position.
Figure 4B:
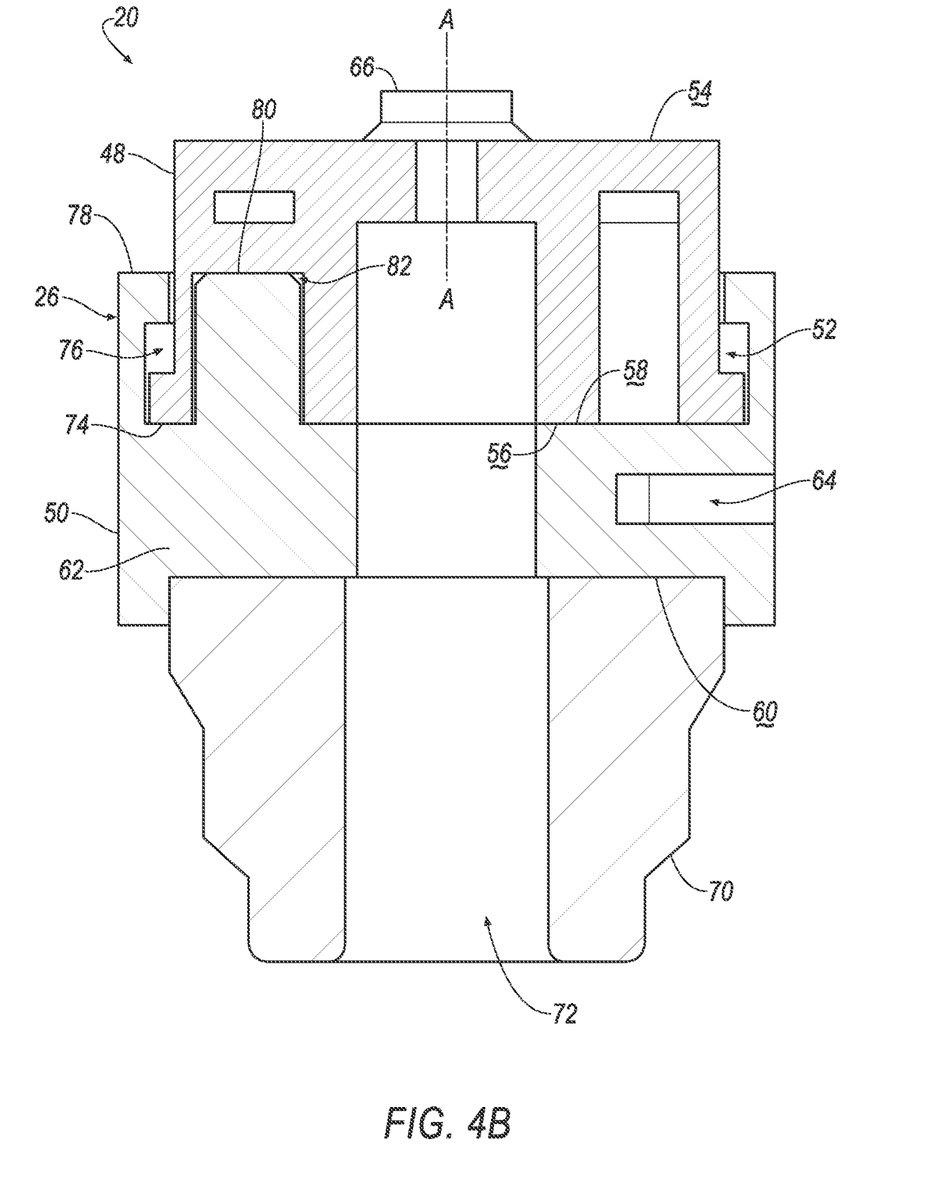
FIG. 4B is a cross sectional view along line 4 of the valve in a closed position.
Figure 5A:
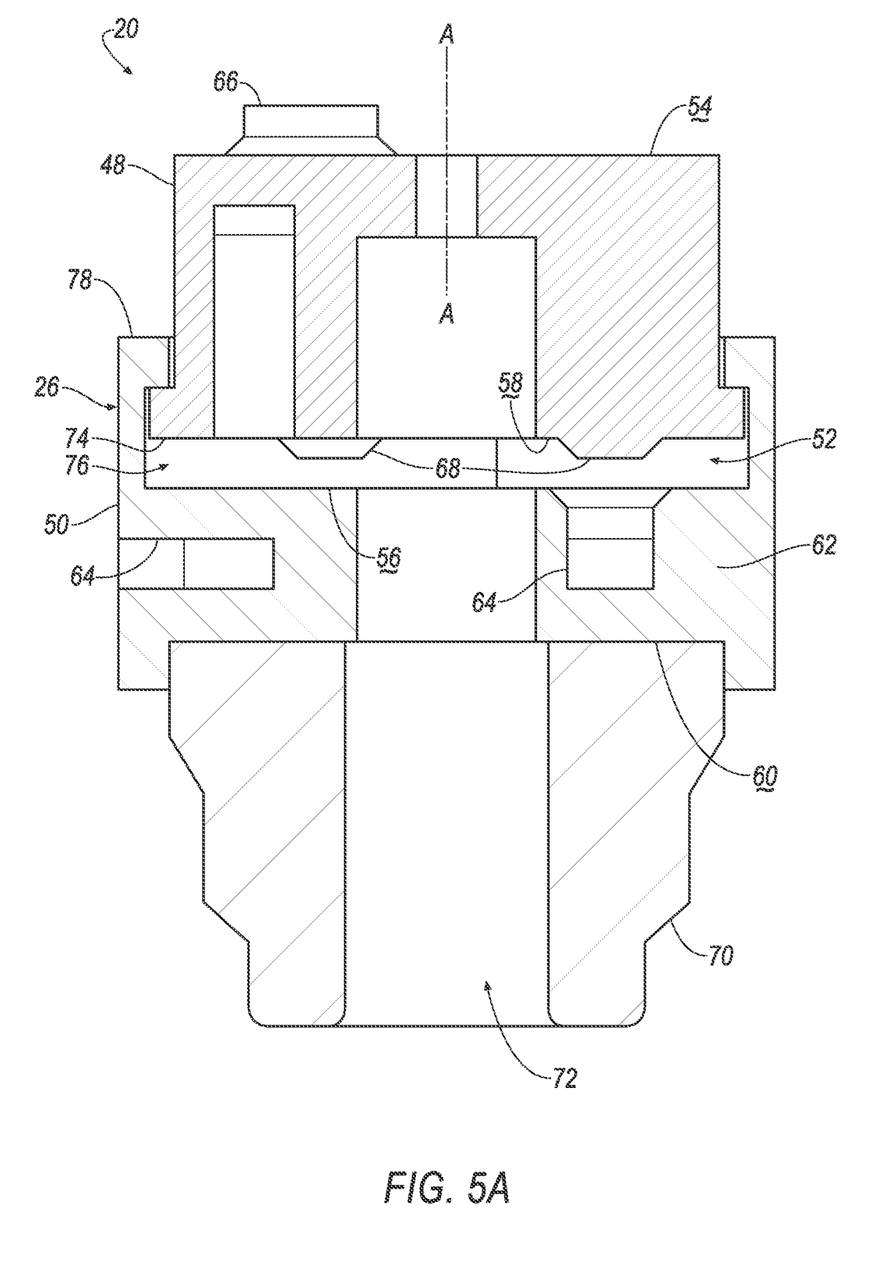
FIG. 5A is a cross sectional view along line 5 of the valve in the open position.
Figure 5B:
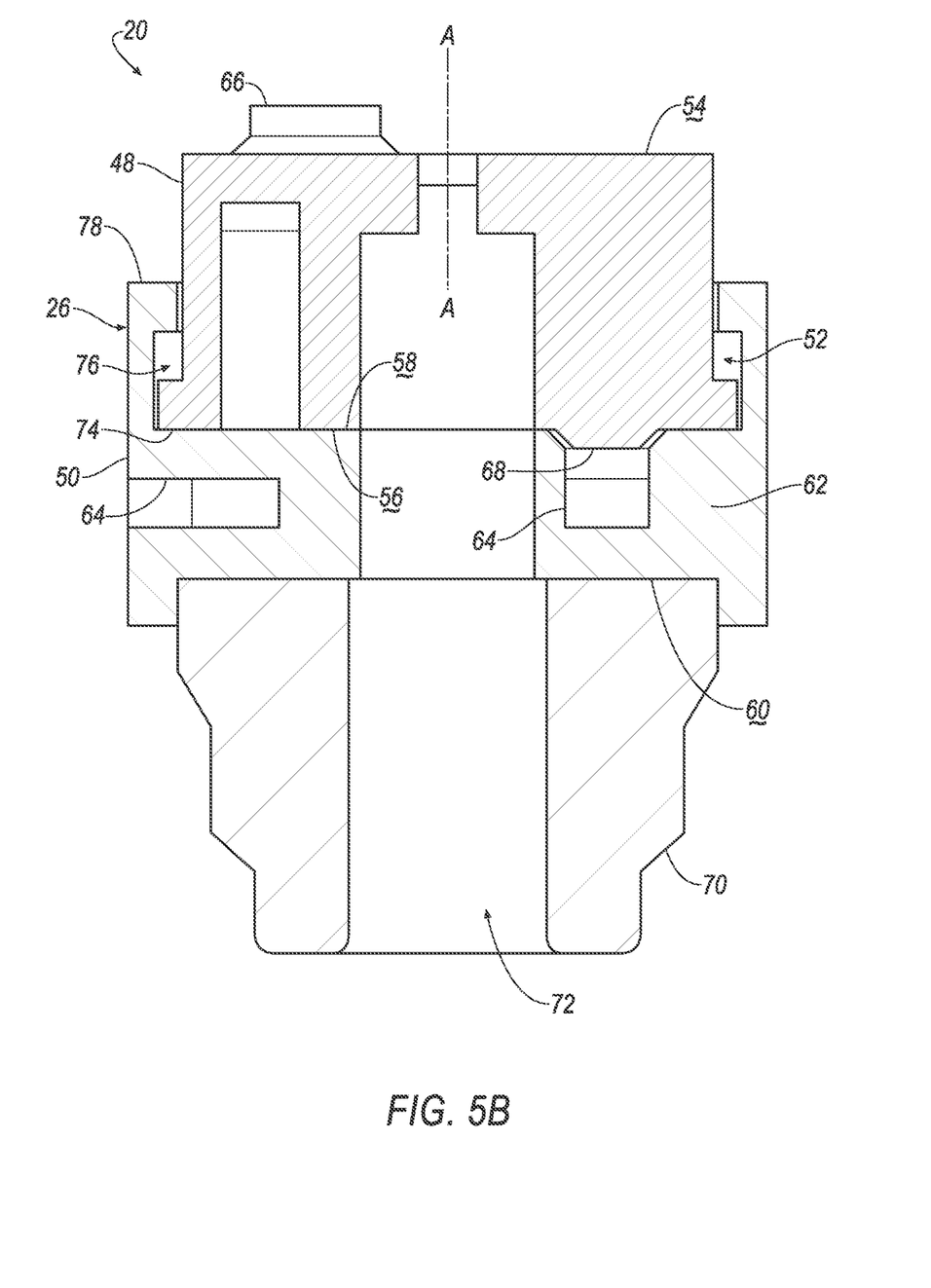
FIG. 5B is a cross sectional view along line 5 of the valve in the closed position.

The valve 26 is engageable with the bump cap 22. Specifically, the valve 26 is moveable from the open position, as shown in FIGS. 4B and 5B, to the closed position, as shown in FIGS. 4A and 5A, by the bump cap 22. The valve 26 is in the open position when the bump cap 22 is in the first position, as shown in FIG. 2A. In other words, the valve 26 is in the open position when the jounce bumper 20 is spaced from the bump cap 22. The valve 26 is in the closed position when the bump cap 22 moves to the second position, i.e., contacting the jounce bumper 20, as shown in FIG. 2B. When the bump cap 22 contacts the jounce bumper 20, the bump cap 22 exerts a force on the jounce bumper 20 to move the valve 26 from the open position to the closed position. Additionally, the bump cap 22 acts as a hard stop to interfere with the jounce bumper 20 and maintain a minimum ride height of the vehicle 10, i.e., a minimum distance between the upper plate 34 and the lower plate 36.

When the valve 26 is in the open position, the chamber 24 is in communication with the inlet 38. In other words, air may flow into and out of the chamber 24 through the inlet 38. When the valve 26 is in the closed position, the valve 26 prevents air flow out of the chamber 24 through the inlet 38. In other words, in the closed position, the valve 26 prevents air flow out of the chamber 24. The valve 26 may be moved from the closed position to the open position by air flow through the inlet 38. Specifically, the air flow through the inlet 38 when the valve 26 is in the closed position may increase the air pressure in the chamber 24, which may move the bump cap 22 relative to the jounce bumper 20 from the second position to the first position, i.e., along the axis A.

The valve 26 includes a cap 48 and a base 50 slideably engaged with the cap 48. The base 50 is slideable relative to the cap 48 along the axis A from the open position to the closed position. In the open position, the base 50 and the cap 48 define a cavity 52 therebetween, as shown in FIGS. 4B and 5B. In the closed position, the base 50 is moved across the cavity 52, i.e., along the axis A, and contacts the cap 48, as shown in FIGS. 4A and 5A.

The cap 48 and the base 50 each include an upper surface 54, 56 and a lower surface 58, 60 spaced along the axis A. The cap 48, e.g., the upper surface 54 of the cap 48, is fixed to the upper plate 34. The cap 48 may be fixed to the upper plate 34 by any suitable manner, e.g., fasteners, welding, etc. The upper surface 56 of the base 50 faces the lower surface 58 of the cap 48. For example, in the open position, the upper surface 56 of the base 50 is spaced from the lower surface 58 of the cap 48 along the axis A. In other words, the upper surface 56 of the base 50 and the lower surface 58 of the cap 48 define the cavity 52 in the open position. As another example, in the closed position, the upper surface 56 of the base 50 abuts the lower surface 58 of the cap 48.

The base 50 includes a side 62 extending from the upper surface to the lower surface along the axis A, as shown in FIGS. 3-5B. The side 62 may extend circumferentially about the axis A. The base 50 may include one or more exhausts 64 in fluid communication with the chamber 24. The one or more exhaust 64 may extend from the upper surface 56 of the base 50 through the side 62 of the base 50. In other words, the cavity 52 may be in fluid communication with the chamber 24 through the one or more exhausts 64 when the valve 26 is in the open position.

The cap 48 includes an intake 66 extending from the upper surface 54 of the cap 48 to the lower surface 58 of the cap 48. The intake 66 may be disposed adjacent to the inlet 38, as shown in FIGS. 2A and 2B. Specifically, the intake 66 may be in fluid communication with the inlet 38. In other words, the inlet 38 is in fluid communication with the cavity 52 through the intake 66 when the valve 26 is in the open position. The intake 66 is in fluid communication with the exhaust 64, i.e., the chamber 24, when the valve 26 is in the open position.

The cap 48 includes a plug 68 extending from the lower surface 58 of the cap 48 along the axis A, i.e., towards the base 50, as shown in FIGS. 5A and 5B. The plug 68 is engageable with the exhaust 64. For example, in the open position, the plug 68 is spaced from the upper surface 56 of the base 50, and in the closed position, the plug 68 is engaged with the exhaust 64. Specifically, in the closed position, the plug 68 is disposed in the exhaust 64. In this situation, the plug 68 prevents communication between the intake 66 and the exhaust 64. In other words, the plug 68 prevents air from flowing into and/or out of the chamber 24 through the jounce bumper 20 when the valve 26 is in the closed position. The plug may include an O-ring (not shown) compressible between the cap 48 and the exhaust 64 when the valve 26 is in the closed position.

The valve 26 includes a cushion 70 fixed to the base 50. Specifically, the cushion 70 may be fixed to the lower surface 60 of the base 50, as shown in FIGS. 3-5B. The cushion 70 extends from the lower surface 60 of the base 50 along the axis A. The cushion 70 may be formed of any suitable material, e.g., plastic, rubber, metal, etc. The cushion 70 may be formed of a same or a different material as the bump cap 22. The cushion 70 may be engageable with the bump cap 22. For example, the cushion 70 may be spaced from the bump cap 22 when bump cap 22 is in the first position, as shown in FIG. 2A. As another example, the cushion 70 may abut the bump cap 22 when the bump cap 22 moves to the second position, as shown in FIG. 2B. When the bump cap 22 contacts the cushion 70 in the second position, the bump cap 22 applies an upward force to the cushion 70, and the cushion 70 transfers the upward force to the base 50, which slides the base 50 upwardly along the axis A relative to the cap 48 to the closed position.

The jounce bumper 20 may include an opening 72 extending annularly about the axis A, as shown in FIGS. 4A-5B. The opening 72 may extend from the cushion 70 through the lower surface 58 of the cap 48 along the axis A. In other words, the opening 72 may be spaced from the upper surface 54 of the cap 48. The rod 44 may be disposed in the opening 72. The end 46 of the rod 44 may be fixed to the jounce bumper 20 in the opening 72. For example, the end 46 of the rod 44 may be fixed to the cap 48. In this situation, the base 50 may be slideable relative to the rod 44. In other words, the base 50 may slide along the rod 44 from the open position to the closed position. The rod 44 may be fixed to the jounce bumper 20 by any suitable means, e.g., fasteners, welding, etc.

The base 50 and the cap 48 may include locking elements engageable with each other. Specifically, the base 50 and the cap 48 may include axial locking elements and rotational locking elements. The axial locking elements engage with each other to limit the movement of the base 50 away from the cap 48. The axial locking element of the cap 48 may include a ledge 74. The axial locking element of the base 50 may include a slot 76 and a ledge 78. The ledge 74 of the cap 48 is adjacent to the lower surface 58 of the cap 48. For example, the ledge 74 of the cap 48 extends about the axis A around the lower surface 58 of the cap 48. The ledge 78 of the base 50 is spaced from the upper surface 56 of the base 50 along the axis A. The slot 76 is disposed between the ledge 78 of the base 50 and the upper surface 56 of the base 50. The slot 76 and the ledge 78 of the base 50 extend about the axis A around the upper surface 56 of the base 50. The ledge 74 of the cap 48 may be disposed in the slot 76 of the base 50. In the closed position, the ledge 78 of the base 50 may be spaced from the ledge 74 of the cap 48 along the axis A, as shown in FIGS. 4B and 5B. In other words, the ledge 74 of the cap 48 may abut the upper surface 56 of the base 50. In the open position, the ledge 78 of the base 50 abuts the ledge 74 of the cap 48, as shown in FIGS. 4A and 5A. In other words, the ledge 74 of the cap 48 is spaced from the upper surface 56 of the base 50. The ledge 74 of the cap 48 slides along the axis A across the slot 76 during movement of the valve 26 from the open position to the closed position.

The rotational locking elements engage with each other to prevent relative rotation between the cap 48 and the base 50. The rotational locking elements include a tongue 80 and a channel 82, as shown in FIGS. 5A and 5B. For example, one of the base 50 and the cap 48 may include the channel 82 and the other of the base 50 and the cap 48 may include the tongue 80. The tongue 80 and the channel 82 may extend along the axis A in the same direction. For example, the tongue 80 may extend from the upper surface 56 of the base 50 toward the cap 48, and the channel 82 may extend from the lower surface 58 of the cap 48 away from the base 50. The rotational locking elements may, for example, include one tongue and one hole spaced diametrically from a second tongue and a second hole. In other words, rotational locking elements may be disposed on opposite sides of the axis A.

The suspension system 32 includes a compressor 84, as shown in FIG. 1. The compressor 84 may, for example, be attached to the vehicle body 12. Alternatively, the compressor 84 may be the engine air compressor, i.e., attached to the engine of the vehicle 10. The compressor 84 intakes air from the atmosphere, pressurizes the air, and discharges the air to each air spring 16. For example, the compressor 84 may discharge the air to each air spring 16 indirectly. In this situation, the suspension system 32 may include a reservoir (not shown) in communication with the compressor 84. The reservoir may, for example, receive the air from the compressor 84 and discharge the air to each air spring 16. In other words, the compressor 84 may discharge the air into the reservoir.

The suspension system 32 includes a valve block 86 in communication with the compressor 84, as shown in FIG. 1. The valve block 86 may be attached to the compressor 84. Alternatively, the valve block 86 may be spaced from the compressor 84. The valve block 86 may include a pressure solenoid (not shown) for each air spring 16, i.e., four pressure solenoids. The pressure solenoids may control the air pressure in each air spring 16. For example, the pressure solenoid opens to allow communication with the air spring 16, and the pressure solenoid closes to prevent communication with the air spring 16. In other words, when the pressure solenoid is open, air may flow into or out of the air spring 16, and when the pressure solenoid is closed, air may be retained in the air spring 16.

Figure 6:
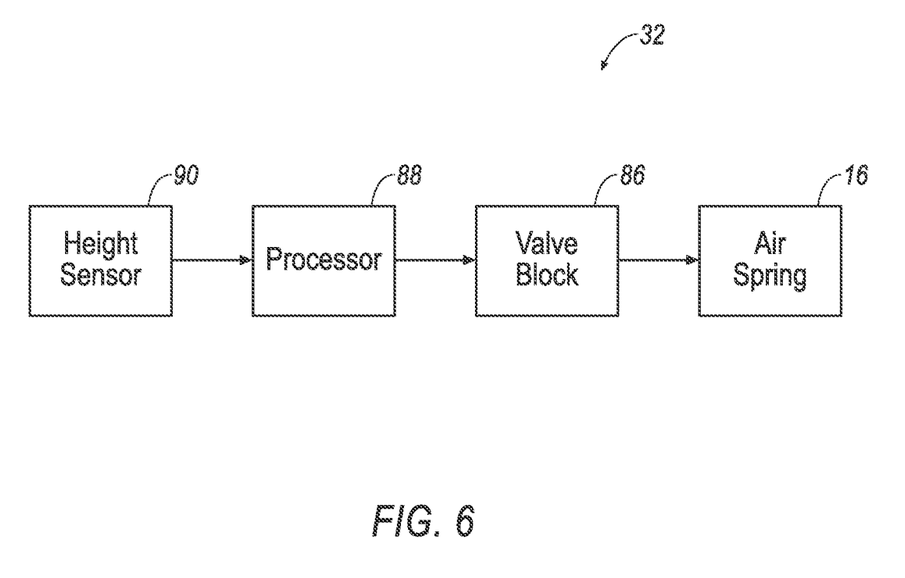
FIG. 6 is a flow chart of a suspension system of the vehicle.

With reference to FIG. 6, the suspension system 32 includes a processor 88 and a memory. The memory may store instructions executable by the processor 88, and the processor 88 may read the instructions from the memory and execute the instructions. For example, the processor 88 may be programmed to adjust the pressure in each air spring 16. Additionally, the processor 88 may be programmed to adjust the ride height of the vehicle 10, i.e., increase or decrease the amount of extension by the damper 40 along the axis A.

With continued reference to FIG. 6, the suspension system 32 includes height sensors 90 programmed to detect the height of the vehicle 10, i.e., the amount of extension of the damper 40 along the axis A. One height sensor 90 is disposed adjacent to each wheel 14 assembly. The processor 88 may receive one or more signals from the height sensor 90 indicating the height of the air spring 16, i.e., the ride height of the vehicle 10. In response to receiving the signals from the height sensors 90, the processor 88 may adjust the height of one or more of the air springs 16 by adjusting the air pressure in the chamber 24.

In order to receive the signals from the height sensors 90 and to adjust the height and pressure of the air springs 16, the processor 88 communicates with the height sensors 90 and the air springs 16, e.g., through a direct electrical wiring, through which an analog or a digital signal is transmitted, or through a communication network like CAN (Control Area Network), Ethernet, LIN (Local Interconnect Network) or any other way.

In operation, the bump cap 22 is in the first position and the valve 26 is in the open position under normal operating conditions of the vehicle 10, as shown in FIG. 2A. During operation, the height sensors 90 detect a ride height of the vehicle 10, and the processor 88 triggers the valve block 86 to adjust the air pressure in one or more air springs 16. When the air pressure in the chamber 24 changes, the bump cap 22 moves relative to the jounce bumper 20 along the axis A. When the air pressure in the chamber 24 decreases below the pressure threshold, the bump cap 22 moves relative to the jounce bumper 20, i.e., towards the jounce bumper 20, to the second position, as shown in FIG. 2B. As the bump cap 22 moves to the second position, the bump cap 22 engages the jounce bumper 20, e.g., the cushion 70. The bump cap 22 exerts an upward force on the cushion 70 that is transferred to the base 50. When the force is transferred to the base 50, the base 50 slides to the closed position, i.e., the base 50 moves across the cavity 52 to contact the cap 48, as shown in FIGS. 4B and 5B. In the closed position, the valve 26 prevents air flow out of the chamber 24. In other words, the valve 26 in the closed position maintains a minimum air pressure in the chamber 24 and a minimum ride height of the vehicle body 12. The minimum air pressure and the minimum ride height are within a normal operating range of the vehicle 10. By maintaining the air pressure and ride height within the normal operating range, the valve 26 prevents or reduces damage to the air spring 16. The valve 26 is moveable to the open position by air flow from the inlet 38. In this situation, the air flow may increase the air pressure in the chamber 24 and move the bump cap 22 to the first position. Specifically, the air flow may push the cap 48 and the base 50 away from each other along the axis A, i.e., to the open position. By allowing the valve 26 to be moved to the open position by supplying air flow through the inlet 38, the valve 26 allows the ride height of the vehicle body 12 and the pressure in the air spring 16 to be increased. In other words, the air spring 16 may be reset above the minimum pressure threshold and the minimum ride height.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An air spring, comprising:
a sleeve defining a chamber expandable and compressible along an axis;
a jounce bumper fixed relative to the sleeve in the chamber;
a bump cap moveable relative to the jounce bumper along the axis from a first position to a second position, the bump cap spaced from the jounce bumper along the axis in the first position and in contact with the jounce bumper in the second position; and
the jounce bumper including a valve moveable by the bump cap along the axis to a closed position when the bump cap moves to the second position;
wherein the valve includes a cap and a base slidably engaged with the cap, the base slidable along the axis relative to the cap between an open position and the closed position;
wherein the cap includes an intake extending parallel to the axis and the base includes a plurality of exhausts spaced from each other circumferentially about the axis, the intake and the exhausts are in fluid communication with each other when the valve is in the open position.

2. The air spring of claim 1, wherein the base includes a cushion engageable with the bump cap, the cushion contacts the bump cap when the bump cap moves to the second position.

3. The air spring of claim 1, wherein the cap includes a lower surface and the base includes an upper surface, the lower surface of the cap and the upper surface of the base define a cavity therebetween in the open position, and the upper surface of the base contacts the lower surface of the cap in the closed position.

4. The air spring of claim 1, wherein the cap includes a lower surface and a plug extending from the lower surface along the axis towards the base, the plug being engageable with the exhaust.

5. The air spring of claim 4, wherein the plug is disposed in the exhaust in the closed position, the plug prevents fluid communication from the exhaust to the intake when the valve is in the closed position.

6. The air spring of claim 1, wherein the cap and the base include axial locking elements slidably engaged with each other.

7. The air spring of claim 6, wherein the cap and the base include first rotational locking elements engaged with each other and second rotational locking elements engaged with each other, the first rotational locking elements are spaced from the second rotational locking elements diametrically about the axis.

8. The air spring of claim 1, further comprising a damper including a tube disposed external to the chamber and a rod extending on the axis from the tube into the chamber, wherein the jounce bumper includes an opening extending annularly about the axis and the rod is disposed in the opening.

9. The air spring of claim 8, wherein the opening extends through the base and partially through the cap, the cap being fixed to the rod and the base being slidable relative to the rod along the axis.

10. The air spring of claim 1, further comprising an upper plate spaced from the bump cap along the axis and including an inlet, wherein the jounce bumper is fixed to the upper plate and the valve is engaged with the inlet.

11. The air spring of claim 10, wherein the valve prevents fluid communication from the chamber to the inlet in a closed position, the valve is moveable along the axis from the closed position to an open position by air flow from the inlet.

12. The air spring of claim 1, wherein the base includes a side extending circumferentially about the axis, the plurality of exhausts are disposed on the side of the base.

13. A jounce bumper comprising:
a valve;
the valve including a cap and a base slideably engaged with the cap;
the base slidable along an axis relative to the cap from an open position to a closed position;
the cap includes a lower surface and the base includes an upper surface, the lower surface of the cap and the upper surface of the base defining a cavity therebetween in the open position, and the upper surface of the base contacting the lower surface of the cap in the closed position; and the cap includes an intake extending parallel to the axis and the base includes a plurality of exhausts spaced from each other circumferentially about the axis, the intake and the exhausts are in fluid communication with each other when the valve is in the open position.

14. The jounce bumper of claim 13, wherein the base includes a cushion extending along the axis away from the cap.

15. The jounce bumper of claim 13, wherein the cap includes a plug extending from the lower surface along the axis toward the base, the plug is engaged with the exhaust in the closed position and prevents fluid communication from the exhaust to the intake.

16. The jounce bumper of claim 13, wherein the valve is moveable along the axis from the closed position to the open position by air flow through the intake toward the base.

17. The jounce bumper of claim 13, wherein the cap and the base include first rotational locking elements engaged with each other and second rotational locking elements engaged with each other, the first rotational locking elements are spaced from the second rotational locking elements diametrically about the axis.

18. The jounce bumper of claim 13, wherein the base includes a side extending circumferentially about the axis, the plurality of exhausts are disposed on the side of the base.

19. An air spring, comprising:
a sleeve defining a chamber expandable and compressible along an axis;
a jounce bumper fixed relative to the sleeve in the chamber;
a bump cap moveable relative to the jounce bumper along the axis from a first position to a second position, the bump cap spaced from the jounce bumper along the axis in the first position and in contact with the jounce bumper in the second position;
a damper including a tube disposed external to the chamber and a rod extending on the axis from the tube into the chamber; and
the jounce bumper including a valve moveable by the bump cap along the axis to a closed position when the bump cap moves to the second position;
wherein the valve includes a cap and a base slidably engaged with the cap, the base slidable along the axis relative to the cap between an open position and the closed position;
wherein the jounce bumper includes an opening extending annularly about the axis and the rod is disposed in the opening.

20. The air spring of claim 19, wherein the opening extends through the base and partially through the cap, the cap being fixed to the rod and the base being slidable relative to the rod along the axis.

* * * * *